US007180415B2

(12) United States Patent
Bankert et al.

(10) Patent No.: US 7,180,415 B2
(45) Date of Patent: Feb. 20, 2007

(54) SAFETY/SECURITY ALERT SYSTEM

(75) Inventors: Troy Wesley Bankert, Chagrin Falls, OH (US); Gregory Alan Gay, Aurora, OH (US); Connie Ann Clore, Solon, OH (US)

(73) Assignee: Speed 3 Endeavors, LLC, Aurora, OH (US)

( * ) Notice: Subject to any disclaimer, the term of this patent is extended or adjusted under 35 U.S.C. 154(b) by 260 days.

(21) Appl. No.: 10/880,906

(22) Filed: Jun. 30, 2004

(65) Prior Publication Data

US 2005/0242944 A1 Nov. 3, 2005

Related U.S. Application Data

(63) Continuation-in-part of application No. 10/836,356, filed on Apr. 30, 2004, now abandoned.

(51) Int. Cl.
*G08B 1/08* (2006.01)
*H04Q 7/00* (2006.01)

(52) U.S. Cl. ............................ 340/539.17; 340/539.1; 340/539.26

(58) Field of Classification Search ........... 340/539.17, 340/539.16, 539.26, 539.1, 539.14
See application file for complete search history.

(56) References Cited

U.S. PATENT DOCUMENTS

| | | | | |
|---|---|---|---|---|
| 5,636,263 | A | 6/1997 | Thomson | |
| 5,991,363 | A | 11/1999 | Thomson | |
| 6,002,748 | A * | 12/1999 | Leichner | 379/48 |
| 6,031,455 | A * | 2/2000 | Grube et al. | 340/539.26 |
| 6,097,288 | A * | 8/2000 | Koeppe, Jr. | 340/517 |
| 6,307,920 | B1 | 10/2001 | Thomson et al. | |
| 6,392,538 | B1 * | 5/2002 | Shere | 340/539.26 |
| 6,633,240 | B1 * | 10/2003 | Sweatt | 340/995.1 |
| 6,847,892 | B2 * | 1/2005 | Zhou et al. | 701/213 |

(Continued)

OTHER PUBLICATIONS

Eighteen pages printed out from web site www.reverse911.com regarding the Reverse 911 Interactive community notification system offered by Sigma Communications Incorporated, copyright 2004. Upon information and belief, the Reverse 911 system, as described in the eighteen page printout, is prior art to applicants' invention.

(Continued)

*Primary Examiner*—John Tweel, Jr.
(74) *Attorney, Agent, or Firm*—Tarolli, Sundheim, Covell & Tummino

(57) ABSTRACT

A safety/security system that includes a central control station and a plurality of remote stations suitable for installation in residential and business buildings. The central control station receives public emergency warnings, notifications and advisories and transmits alert messages to select remote stations based on geographic or other criteria. Each remote station includes an identifier, a visual display, a user interface, and electronics for receiving the alert message from the central control center, processing the alert message to determine if the remote station is an intended recipient of the message by ascertaining if the alert message includes the remote station identifier and, if the remote station is an intended recipient of the alert message, utilizing the display to display information related to the alert message. The remote station also transmits an acknowledgement message to the central control station when a user of the remote station actuates the user interface to verify receipt of the information displayed on the display related to the alert message.

34 Claims, 6 Drawing Sheets

U.S. PATENT DOCUMENTS

| | | | | |
|---|---|---|---|---|
| 6,914,525 | B2 * | 7/2005 | Rao et al. | 340/531 |
| 6,950,018 | B2 * | 9/2005 | Merrell et al. | 340/539.1 |
| 6,985,450 | B2 * | 1/2006 | Slemmer et al. | 370/270 |
| 7,005,981 | B1 * | 2/2006 | Wade | 340/539.17 |
| 7,042,350 | B2 * | 5/2006 | Patrick et al. | 340/521 |
| 2002/0069202 | A1 | 6/2002 | Deans et al. | |

OTHER PUBLICATIONS

Ten pages printed out from web site www.guidelight911.com regarding Guide Light 911 emergency response light system offered by Guide Light 911 and distributed by Emergency Safety Systems, copyright 2003. Upon information and belief, the Guide Light 911 system, as described in the ten-page printout, is prior art to applicants' invention.

Three pages printed out from web site www.roamsecure.net regarding the Roam secure alert network system offered by Roam Secure, Inc., copyright 2003. Upon information and belief, the Roam secure alert network system, as described in the three pages print out, is prior art to applicants' invention.

* cited by examiner

SAFETY/SECURITY ALERT SYSTEM

CROSS-REFERENCE TO RELATED APPLICATION

This application is a continuation-in-part of U.S. application Ser. No. 10/836,356, filed on Apr. 30, 2004, now abandoned.

FIELD OF THE INVENTION

The present invention relates to a safety/security alert system that includes a central monitor and control station and a plurality of remote stations suitable for installation in residences and businesses for providing safety and/or emergency alerts to users of the system and further providing a visible beacon to guide emergency personnel to a home or business location where emergency services have been requested.

BACKGROUND ART

Providing for public safety/security includes numerous functions such as notifying citizens of a community of health, safety and/or emergency situations, e.g., severe weather alerts, "Amber alerts" for missing children, areas to avoid because of accidents, fires, chemical spills, etc. Current methods used by federal, state and local governmental agencies and emergency services organizations to inform the public of emergency situations are generally based on radio and television broadcasts. Although these methods may reach many of the intended recipients, they also miss a significant number. At any moment, there is a significant portion of the public that is not tuned into these broadcasts. Moreover, if the emergency has caused a power outage in an area, then AC powered televisions and radios are ineffective for delivering the emergency message to persons in the power outage area. Moreover, such notification systems do not provide any method for verifying that an emergency message has been delivered to and received by the intended recipients.

Some communities have civil defense sirens and/or loudspeakers which may be used to alert residents of an emergency situation. However, not all communities have such sirens and/or loudspeakers. Additionally, residents who have heard siren "tests" may become conditioned to and ignore the siren. Further, the use of sirens provides no information regarding the emergency and relies upon individual residents obtaining information from other sources.

Sigma Communications Incorporated of Indianapolis, Ind. (www.reverse911.com) offers communities a proprietary calling system under the trade name REVERSE 911® for notifying residents of emergencies. The REVERSE 911® system allows a community subscribing to the system to utilize the local phone system to call and notify residents of an emergency via a prerecorded phone message. However, if the area's phone system is down, residents may not be timely notified of the emergency. Further, if a resident of a community does not have voice mail and is not in the house to pick up the phone, he or she will not receive the prerecorded notification. Further, residents with cordless phones will not receive the notification if the electrical power is out. Moreover, residents with unlisted numbers will not be contacted. Finally, the REVERSE 911® system relies on phone banks to contact residents with a prerecorded phone message. If there is a need to contact a large number of residents in a wide-spread emergency, the ability to contact all residents in a sufficiently short period of time using phone banks may be problematic.

Another aspect of public safety/security includes responding to emergency calls from the public. In the case where emergency personnel must locate a residence or business that has called for emergency services, e.g., police, fire or emergency medical, current methods used are almost entirely based on the ability of the emergency personnel to view an address displayed on the building where the call originated, e.g., an address displayed on a mail box, on the outside of the building, or on a sign on or near the building. "Hunting" for the building where the request originated slows emergency service response time, which could have significant negative effect on the outcome of the emergency situation.

One prior art attempt to deal with the problem of locating a building (house or business facility) where a call for emergency help originated is disclosed in U.S. Pat. No. 5,636,263 to Thompson. The '263 patent discloses an electronic circuit coupled to the phone line of a building and also coupled to a high-intensity stroboscopic LED identification light mounted on or near the building, i.e., on a mailbox in front of the building. The stroboscopic light, when activated, guides emergency personnel to the building where an emergency call originated. The stroboscopic light is activated by the emergency dispatcher via a special tone signal that is transmitted by the dispatcher over the telephone line. Upon receiving the special tone signal, the electronic circuit activates the stroboscopic light.

One shortcoming of the '263 patent is that it depends upon the emergency dispatcher to generate the special tone signal to actuate the light. What is more desirable is that such a light be automatically actuated anytime a call is made from the home or business to emergency services. Another shortcoming of the '263 patent is that it does not provide for transmitting incoming emergency messages to a home or business from governmental agencies.

What is needed is a robust safety/security alert system that includes a central monitor and control station and remote stations suitable for installation in buildings housing residences and businesses for providing safety and/or emergency alerts to users of the system. What is also needed is a safety/security alert system that provides for verification that a user of a remote station has received a safety and/or emergency alert broadcast by the central monitor and control station. What is additionally needed is a safety/alert system that provides a visible display to assist emergency personnel to identify a home or business location where emergency services are required.

SUMMARY OF THE INVENTION

The present invention is directed to a safety/security system having a central control station or center transmitting alerts regarding governmental health, safety, weather and other local, regional or national safety and/or emergency advisories and/or notifications to selected remote stations and that provides verification that a user of a remote station has indeed received an alert via a transmission from the remote station to the central control station.

The safety/security system of the present invention also provides for the activation of a beacon light associated with a remote station when a call to emergency services is made from a building where the remote station is disposed to assist emergency personnel en route to the location. The beacon light is also activated to notify a user of the system that a high importance or level alert message has been received by the user's remote station.

In one exemplary embodiment, the safety/security system of the present invention includes:

a) a central control station for receiving an advisory from an agency and transmitting an alert message regarding the advisory to a remote station, the alert message including an identifier to identify the remote station that is an intended recipient of the alert message and for receiving a transmission from the remote station indicating that the alert message has been acknowledged by a user of the remote station;

b) the remote station including a receiver, a transmitter, a visual display, and a user interface, the remote station utilizing the receiver to receive the alert message from the central control station, processing the alert message to determine if the remote station is an intended recipient of the message by determining if the identifier in the alert message corresponds to an identifier of the remote station and, if the remote station is an intended recipient of the alert message, utilizing the display to display information related to the alert message, the remote station utilizing the transmitter to send an acknowledgement message to the central control center when a user of the remote station actuates the user interface to acknowledge receipt of the alert message.

Advantageously, the system may also include a visible beacon associated with the remote station and mounted to or near the building where the remote station is located. The beacon is positioned so as to be visible to emergency personnel en route to the building and to occupants of the building who are outside in the vicinity of the building. The beacon is actuated by the remote station under either of the following conditions:

1) an alert message having a predetermined level of importance is received by the remote station;

2) a call is made to emergency services from the building; or 3) a targeted activation is received by the central control station.

These and other objects, advantages, and features of the exemplary embodiment of the invention are described in detail in conjunction with the accompanying drawings.

DETAILED DESCRIPTION

Figure 1:
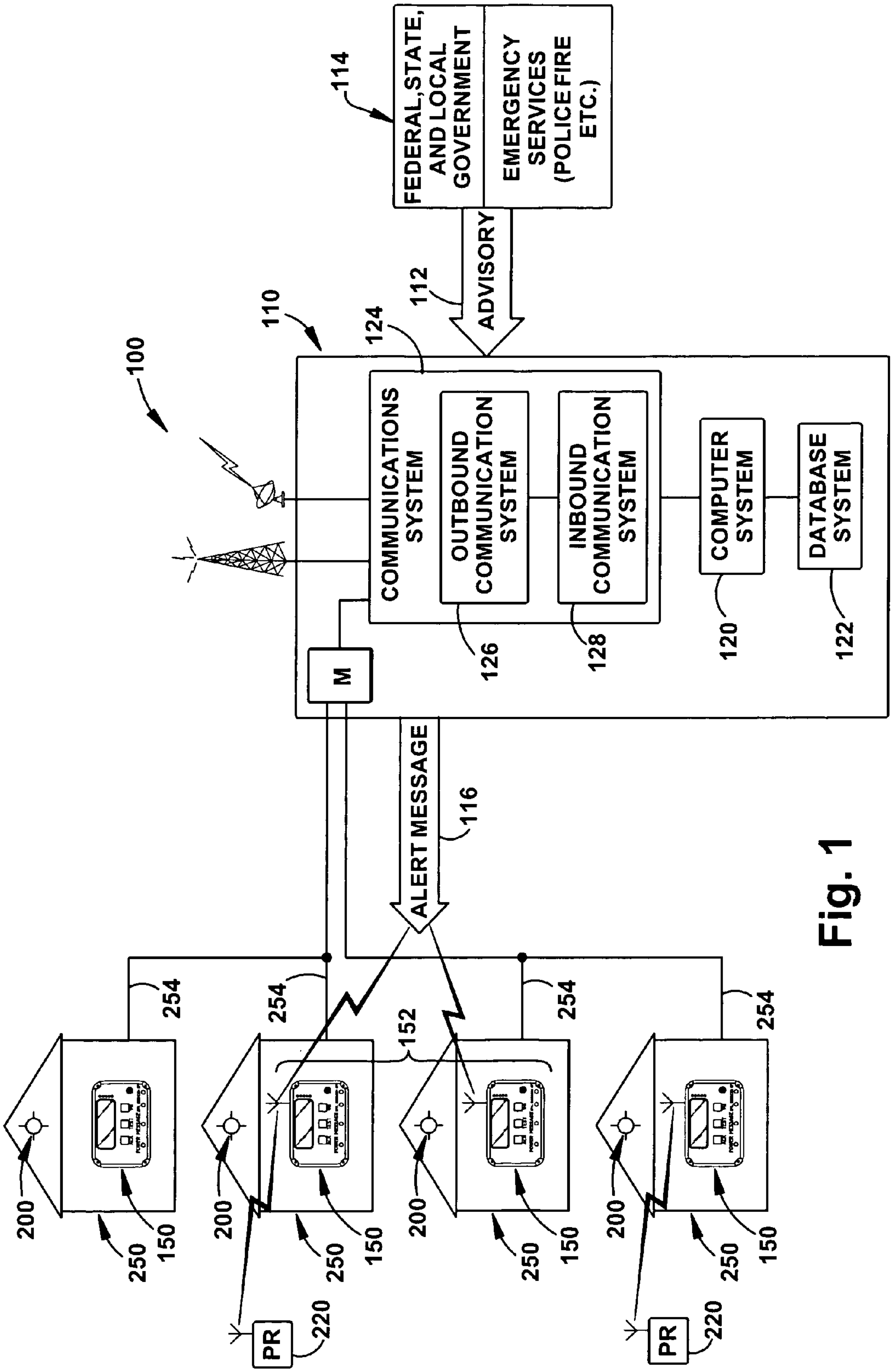
FIG. 1 is a schematic block diagram of a safety/security alert system of the present invention.

Turning to the drawings, a block diagram of a safety/security alert system of the present invention is shown generally at 100 in FIG. 1. The safety/security alert system 100 is comprised of two major subsystems, a central monitoring and control station or center 110 and a plurality of remote stations 150. Additionally, each of the plurality of remote stations 150 has associated with it at least one visible beacon 200 and may have one or more personal remotes 220 associated with it.

As will be discussed below, a beacon 200 includes an illumination source 202 that is actuated by its associated remote station 150. The remote stations 150 are disposed in or on buildings 250, e.g., residences (homes, apartments, condominiums), commercial buildings (businesses, schools, hospitals, etc.). The personal remote 220 is a small device designed to be carried by a user and can be used for requesting emergency services.

Central Monitor and Control Station 110

The central monitor and control station 110 receives advisories 112 from various governmental, quasi-governmental and private agencies and authorities 114 relating to health, safety and/or emergency matters (e.g., severe weather warnings, natural or man-made disasters, reports of missing children and or dangerous criminals in a particular area, power outages, school closings, etc.). Advisories as used herein include advisories, notifications and warnings issued by agencies, whether governmental agencies or authorities, quasi-governmental agencies or authorities or private businesses.

Upon receiving an advisory 112, the central monitoring and control station 110 analyzes the advisory and determines which remote stations need to be alerted and provided information regarding the advisory 112. The subset of remote stations 152 that need to be notified regarding the advisory depends on numerous factors including the nature of the advisory, the geographic area affected by the advisory, as well as information stored about the user or user group of each remote station 150. As used herein the term "user" or "user group" of the remote station 150 means the person or group of people served by a particular remote station 150. For example, if a particular remote station 150 is located in a house, condominium or apartment, the user would typically be the resident members of the household of the house, condominium, or apartment. If the remote station 150 is located at a business location, the user would be the group of employees working at that business location.

Thus, information about the user of the remote station 150 would include information about one or more persons served by that remote station. Information about the user group that would impact the decision to transmit information concerning a particular advisory 112 to a particular remote station 150 would include, for example: Does the user group include school aged children? Does the user have a medical condition that would be adversely affected by certain chemicals or pollutants? Is the user a non-ambulatory person who would need transportation assistance to evacuate the location of the remote station 150?

After determining: 1) the information to be transmitted to the remote stations regarding the advisory; and 2) determining a set of remote stations 152 which need to be provided information about the advisory, the central station 110 transmits an alert message 116 to the selected set of remote stations 152. The transmission of the alert message 116 from the control station 110 to a remote station 152 may be a direct communication or via a third party communications network. For example, if there was a direct rf transmission from a transmitter of the control station 110 to a receiver of the remote station 152, this would be a direct communication. If on the other hand, the rf transmission of the control station 110 were routed through a third party's cell phone communications network, this would be via a third party communications network. It would be expected that most of the alert messages 116 will involve a third party communications network.

The central monitoring and control station 110 maintains the central systems required for the alert system 100 to function. The central monitoring and control station 110 includes a computer system 120, a database system 122, and a communication system 124. The control station computer system 120 is used to perform several functions. A system operator of the control center 110 can initiate the sending of alert messages 116 to remote stations 150 based on geo code and/or other criteria. The alert messages 116 can be sent to all users or filtered by any number of criteria such as: by specific address, by street(s), by community, type of alert, etc. System diagnostics will also be performed by the computer system 120. On a scheduled basis or on demand, the computer system 120 is able to validate the functionality of the remote stations 114 and the communication link to the remote station 150. As part of this diagnostic capability, the computer system 120 is able to download firmware updates to the remote stations 150.

Database systems 122 are maintained at the central control center 110 to store and maintain all relevant information about the users of the system 100 and the installed equipment at the user's location. This includes, but is not limited to, information such as names, addresses, phone numbers, cell phone numbers, email addresses, remote station identifier (serial number), and whether the user is an active customer.

The communication systems 124 include an outbound communication system 126 providing a link between the central computers 120 and the remote stations 150 and an inbound communication system 128 providing a link to receive advisories from and to communicate with governmental and quasi-governmental authorities and agencies (police, fire, municipal emergency medical services, schools, colleges and universities, national weather service, state and federal EPA, port authorities, Center for Disease Control, Office of Homeland Security, State National Guard, National Park Service, Customs Service, Nuclear Regulatory Commission, FBI, state National Guard and federal military units, etc.), as well as private entities (e.g., hospitals, private schools and colleges, private ambulance services, private weather services, community crimestopper and watchdog groups, management groups overseeing stadiums and arenas, newspapers, television and radio stations) that have a connection with public health, awareness, or safety.

The control center communication system 124 supports both hardwired and wireless communication between the central computer system 120 and the remote stations 150. Hardwired communication would include the use of standard telephone lines extending between the control center 110 and the building 250 where the remote station 150 is located, the remote station 150 being coupled to the building telephone line. Hardwired communication may also include cable transmission lines and/or leased/dedicated phone lines.

Wireless communication would preferably comprise wireless cellular radio communication using the established cellular phone network in the United States. In the event that a cellular phone network is not available in a given remote station location, the control center communications system 124 would be expanded to support other means of wireless communication between control center 110 and the remote stations 150, such as wireless radio networks (i.e. 802.11a/b/g/n mesh networks smart antennas or similar), land radio, satellite, and other wireless communication methods known to those of ordinary skill in the art.

The control center communications system 124 would also support both hardwired and wireless communications between the control center 110 and federal, state and local authorities and agencies and others providing emergency advisories. The communications system 124 would support any number of communication media such as telephone, lease line, web service, web interface, wireless cell, satellite, and others known to those of ordinary skill in the art.

Remote Stations 150

The remote stations 150 are electronic devices capable of two-way communication with the control center 110. The remote stations 150 are dispersed geographically, being located in buildings 250 of the respective users. The remote stations 150 are the means through which the control center computer delivers emergency information in the form of alert messages 116 to users and the means by which users acknowledge the fact that they have received the alert messages 116. The geographic location of each remote station 150 is stored in the control center database system 122.

Remote Station Housing 154

Figure 2:
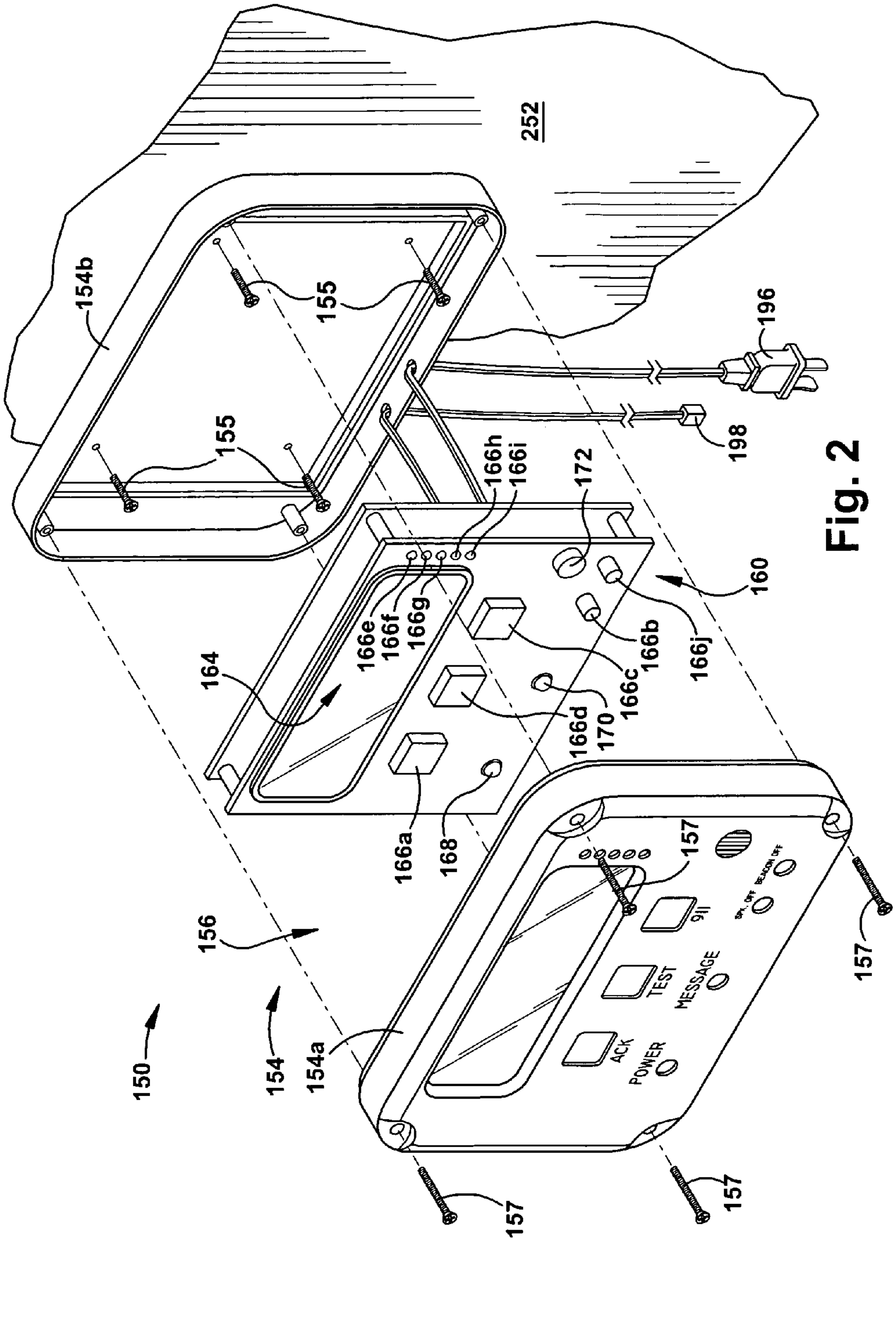
FIG. 2 is a schematic representation of a remote station of the safety/security alert system of FIG. 1.

As can best be seen in FIG. 2, the remote station 150 includes a housing 154 that supports the electronics 156 of the remote station 150. The housing 154 is comprised of two mating, high-impact, durable plastic pieces and is adapted to be mounted to an interior wall 252 of the building 250 via screws 155 where the station 150 is located. Alternately, the housing 154 may be placed on a flat surface, such as a table or desk. Mating front and back plates 154*a*, 154*b* of the housing 154 define an interior area 156 in which station electronics 160 are disposed. The two pieces 154*a*, 154*b* are held together by a plurality of screws 157 and, when disassembled, provide for access to remote station electronics 160.

The remote station 150 includes a conventional three prong plug connector 196 adapted to be plugged in a conventional 120 V AC power outlet of the building 250 and provide AC power, $V_{IN}$, to the station 150. The remote station further includes a phone connection 198 adapted to be plugged into a phone jack of a phone system 254 of the building 250.

Remote Station Electronics 156

Figure 3:
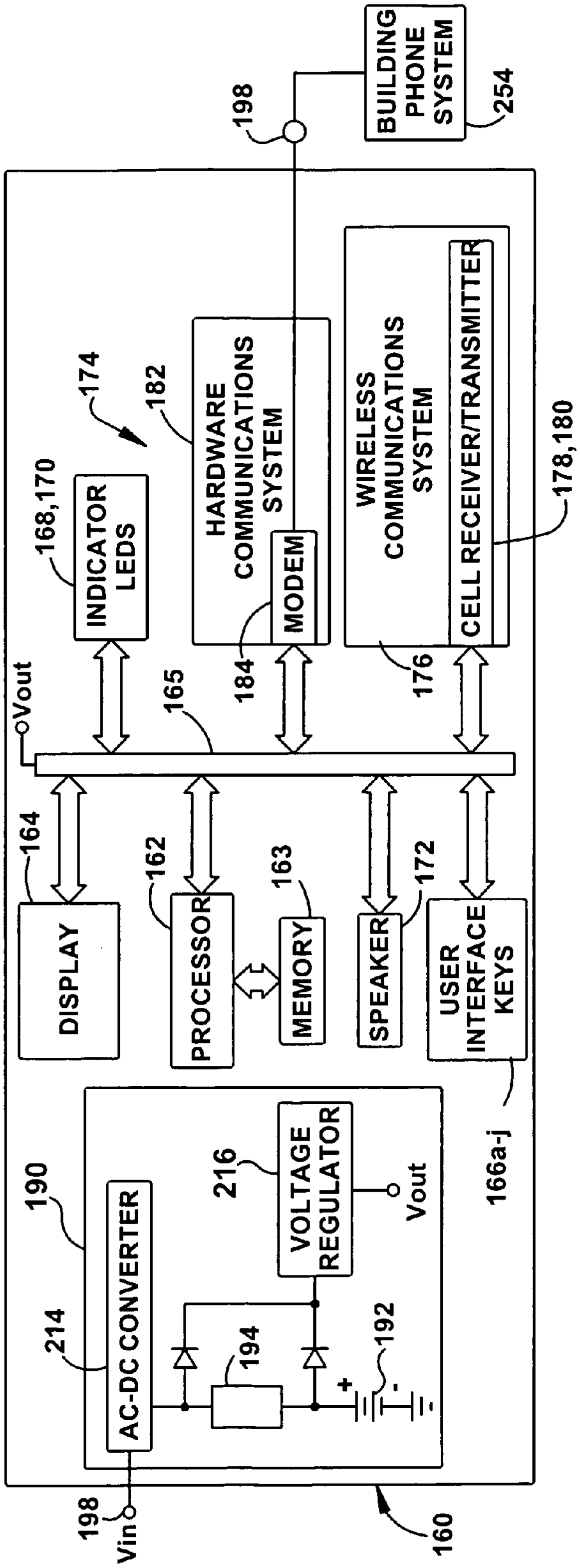
FIG. 3 is a block diagram of the remote station of FIG. 2.

The remote station electronics 160, seen schematically in FIG. 3, preferably are digital electronics and include a digital integrated circuit or processor 162, for example, a programmable controller, application specific integrated circuit (ASIC), a field programmable gate array (FPGA), a programmable microprocessor, such as a PIC chip, or the like. One suitable processor would be the Motorola part no. MC9328MXL sold by Motorola Inc., Schaumburg, Ill. The processor 162, utilizing internal memory or one or more memory chips 163, executes the programming that performs the functionalities of the remote station 150 as described herein including interface and communication with the central control 110 via a communications system 174, the beacon 200 and a personal remote 220, display of alert messages 116 on a display 164, user interface including a plurality of user input keys 166*a–j*, a display 164, a plurality of indicator lights 168, 170, and a speaker 172. Preferably, to simplify fabrication, the processor 162 and the electronic components are coupled to a data, control and power systems bus 165.

The memory 163 would preferably include nonvolatile, ROM program memory. The program memory would be used to store the operating firmware of the remote station electronics 160. Desirably, the program memory is flash-type memory which is erasable and reprogrammable. Suitable program memory would include Hitachi part no. HN29V51211T-50 sold by Hitachi in the United States via Renesas Technology America, Inc., San Jose, Calif. The memory 163 would preferably also include RAM work memory that the operating firmware would use for temporary data storage. Suitable work memory would include Hitachi part no. HM6216514LTTI-5SL.

The remote station electronics 160 includes the display 164 for displaying alert messages 116 and system status information. The display 164 is preferably a liquid crystal display that is nonvolatile, retaining its display even in the absence of power and displays both text and graphics. The display 164 is at least 320×240 pixels and has a minimum size of 3×2.24 inches. Preferably, the display 164 is a color display. One suitable display would be Optrex part no. F-51373GNC-FW-AH sold by Optrex America, Inc., Plymouth, Mich.

User interface is accomplished by a plurality of user input keys 166*a*, 166*b*, 166*c*, . . . , 166*j*. Specifically, the user input key 166*a* is an acknowledgement key which, when depressed by a user, sends a radio frequency (rf) acknowledgement signal from the remote station 150 to the central control center 110 acknowledging receipt of the alert message 116 currently displayed on the display 164. Having received acknowledgement of the alert message 116 by the remote station 150, the control center 110 sends an rf signal to remove the message 116 from the display 164. It should be recognized that other methods of user interface instead of or in addition to user input keys 166*a–i* are possible and within the scope of the present invention, for example, the use of a touch sensitive display screen.

The remote station electronics 160 further includes a pair of indicator lights 168, 170. The first indicator light 168 is a two color LED. The remote station electronics 160 causes a display of the color green by the first indicator light 168 to indicate that the remote station 150 is being powered by AC power. Display of the color yellow by the first indicator light 168 indicates that the remote station 168 is being powered by the battery pack. Low battery voltage is indicated by flashing yellow light by the indicator light 168. The second indicator light 170 is a red LED. The remote station electronics 160 causes the red LED indicator light 170 to flash to signal the user that an alert message 116 has been received and is displayed on the LCD display 164. When the user depresses the user input key 166*a* to acknowledge receipt of the alert message 116, the LED indicator light 170 is deactivated. If a fault is detected in the remote station electronics 160, the electronics will simultaneously flash both indicator lights 168, 170.

In addition to the second indicator light 170, if the alert message 116 is deemed by the control center 110 to have a sufficiently high level of importance, the user is notified of that the alert message has been received by a speaker 172, which provides a distinctive periodic audible alarm sound to alert the user. For example, a high important alert message 116 might be information regarding a hazardous chemical spill in the geographic vicinity of the user building 250 whereas a low importance alert message 116 may be information regarding a daily weather forecast for the user's geographic area when no severe weather is expected in the forecast.

When the alert message 116 is acknowledged by the user, the remote station electronics cease the alarm sound. A single beep is emitted through the speaker 172 when the remote station is first powered up. Upon loss of AC power, the remote station electronics 160 switches over to battery operation and emits a periodic beep to indicate AC power is out and the station is using battery power. If the user depresses the user input key 166*b*, the periodic beep, indicating battery operation of the remote station 150, is silenced to save battery life.

Remote Station Communication System 174

The remote station electronics 160 includes the communication system 174 that provides for both wireless and hardwired communications links with the control center 110. Preferably, a wireless communication system 176 including a cellular rf transmitter 178 and a cellular rf receiver 180, is utilized for receiving an alert message 116 from the central control center 110 and transmitting an acknowledgement or verification of the receipt of the alert message 116. A transceiver, including both a transmitter and a receiver in a single housing, may be used as the transmitter 178 and receiver 180. One suitable wireless cell transmitter and receiver (transceiver) unit 178, 180 is the Motorola part no. i.200-21 chip set. The foregoing chip set includes a transmitter, receiver, amplifiers and other components necessary to implement a wireless cellular communication system 176.

Downloading of updates and other diagnostic functions are typically performed via a hardwired communications system 182 including an internal modem 184, coupled to a telephone system of the building 250. However, it should be recognized that the wireless communication system 176 could also be used for downloading of updates and other diagnostic functions.

The hardwired communications system 182 utilizes land-based telephone lines extending between the remote station 150 and the control center 110. The telephone lines are standard dial up telephone lines having either two or four wire lines. The internal modem 184 converts audio tone signal transmitted across dial-up telephone transmission lines to binary digital information that can be processed by the remote station processor 162. Alternately or in addition to the telephone link between the remote stations 150 and the control center 110, the hardwired communications system 182 may include cable transmission lines and/or leased/dedicated telephone and data transmission lines.

As noted above, the hardwired communications system 182 may be utilized for diagnostics and download of system updates. On a periodic basis, either based on a prescheduled time or due to a wireless prompt from the control center 110, each of the remote stations 150 will connect via its respective modem 184 to the control center 110 to check for updates and to report its status.

If an update is available at the time that a remote device 150 dials the control center 110, the control center computer system 110 will initiate an operating system download command. Upon successful completion of the download command, the control center 110 will enter into its log information about which update was completed and record a time of completion. Alternately, the remote devices 150 may automatically receive updates via the wireless communications system 176.

During each dial-up session with the control center 110, the remote station 150 will report any diagnostic status information. The control center computer system 120 will use any diagnostic faults reported to initiate corrective action. The control center computer system 120 will also monitor for failure of the remote station 150 to dial-in at the established interval as an indication of possible device failure.

The remote station wireless communication link 176, as noted above, is utilized to deliver alert messages 116 and, if a call is placed by a user for emergency services (i.e., a call to 911 is made via the building telephone system 254), the transmitter wireless communication link 176 is used to send an rf signal to activate the beacon 200. Preferably, the wireless communication link 176 comprises the cellular radio transmitter 178 and receiver 180.

The cellular radio transmitter 178 and receiver 180 communicate with the control center 110. The transmitter 178 also communicates with a cellular radio receiver or transceiver 204 of the beacon 200. A remote station 150 with a cellular communication system may be used in any geographic area where cell radio coverage is available.

Other wireless communication options including wi-fi radio and satellite are contemplated by and within the scope of the present invention. Wi-fi is a wireless networking technology currently using the 802.11a/b/g/n Ethernet wireless protocol. There are many geographic areas that have wi-fi radio coverage and many additional areas planned or in process of being installed. In these areas, a remote station supporting wi-fi communication technology can be used to provide service.

In remote geographic areas, cell radio coverage or wi-fi radio coverage is sparse or non-existent. In these areas, satellite communication provides an alternative. There are several satellite networks that can provide a wireless link to a remote station 150. These would include networks that currently provide such services as internet access, radio (i.e. XM and Sirus), and television. A remote station 150 supporting a satellite link can serve these remote geographic areas.

Remote Station Power Supply 190

The remote station 150 is configured to operate on AC or battery power. The remote station electronics 160 include a power supply 190, which provides a source of low voltage (3–5 V DC) power, $V_{OUT}$, for the electronics 160. The power supply 190 is coupled to an AC power source, $V_{IN}$, 95–125 VAC 60 Hz, that is routed through the three prong electrical plug 196. When $V_{IN}$ power to the power supply 190 is interrupted, for example, during power outages, the remote station power supply 190 includes a rechargeable battery pack 192 that acts as a backup to $V_{IN}$ AC power. The battery pack 192 has sufficient power to provide 12–48 hours of operating time. During AC operation, a charging circuit 194 charges the battery pack 192 to keep it fully charged. The power supply 190 includes an AC to DC converter 214 and a voltage regulator 216 to convert the $V_{IN}$ AC power to regulated $V_{OUT}$ low voltage DC power.

Remote Station Identifier

To permit the control center 110 to select the group of one or more remote stations 152 that need to receive an alert message 116, each remote station 150 must necessarily have a unique identifier or serial number. The unique identifier is programmed into the remote station 150 during the manufacturing process and cannot be altered in the field.

The remote station identifier is used in data communications from and to the remote station 150. If the remote station 150 transmits a message either via a hard-wired or wireless communication link to the control center 110, it includes the remote station identifier as a method of identifying where the message has originated. The control center database system 122 maintains a database that correlates the identifier with the remote station, along with information regarding the user and the location of the remote station.

Certain remote stations 150 will be configured as "universal" remote stations, with a universal identifier, to receive, process and display all message alerts 116. Such "universal" remote stations would typically be associated with users such as national wire services, newspapers, radio stations, and television stations (e.g., CNN, CNBC), federal government agencies, and nationwide transportation carriers such as airlines, rail carriers and truck lines that desire to receive all message alerts transmitted throughout the system 100, i.e., across the nation. Alternately, some remote stations 150 will be configured as "geographic area universal" remote stations that receive, process and display all message alerts sent in a geographic area. Typical users of such geographic area universal remote stations would include state and local agencies and authorities including local fire, police and EMS departments, locally based newspapers, radio and television stations, and private security and armored car companies.

Alert Message 116

When an alert message 116 is broadcast by the control center 110, the message includes the identifier or identifiers of the group of remote stations 152 that the message 116 is intended for. This is important in cases where an alert message 116 may be detected by multiple remote stations, i.e., a cellular radio transmission that may be picked up by a plurality of remote stations in the vicinity of a transmission tower, but is intended for less than all of the remote stations that pick up the transmission. In such a case, although multiple remote stations 150 may receive the message 116, the listing of identifiers allows only the intended group of remote stations 152 to act on the received message, i.e., display the message on the display 164. Stated another way, when it is necessary to send an alert message 116 to the select group of remote stations 152, a command is sent by the control center 110 to all intended recipients. The command contains data on type of alert and includes the message content, including any text and graphics.

Once an alert message 116 is received by the remote station 150 and the remote station verifies that the message 116 is intended for the remote station, information regarding the message 116 will be displayed or presented on the station display 162 until the user depresses the acknowledgement key 166*a*, sending an acknowledgement signal to the control center 110. In turn, the control center 110 sends an alert cancel command to the remote station 150 canceling the display of the alert message 116.

A broadcast identifier is also defined and made available to the control center communications systems 124. This feature allows delivery of a single message to all remote stations 150. For example, if the control center 110 receives an advisory 112 that is deemed to have a high level of importance, the message alert 116 relating to the advisory 112 will include the broadcast identifier to permit all remote stations 150 to receive and display the alert 116 on the display 164.

The control center 110 may also selectively provide non-emergency safety and security information via text and/or graphic messaging to the users via the remote stations 150. Examples of which are: missing child, sexual offender living in vicinity, dangerous person in vicinity, and others that would be beneficial to users of the system 100.

Remote Station Processing Logic

Figure 5:
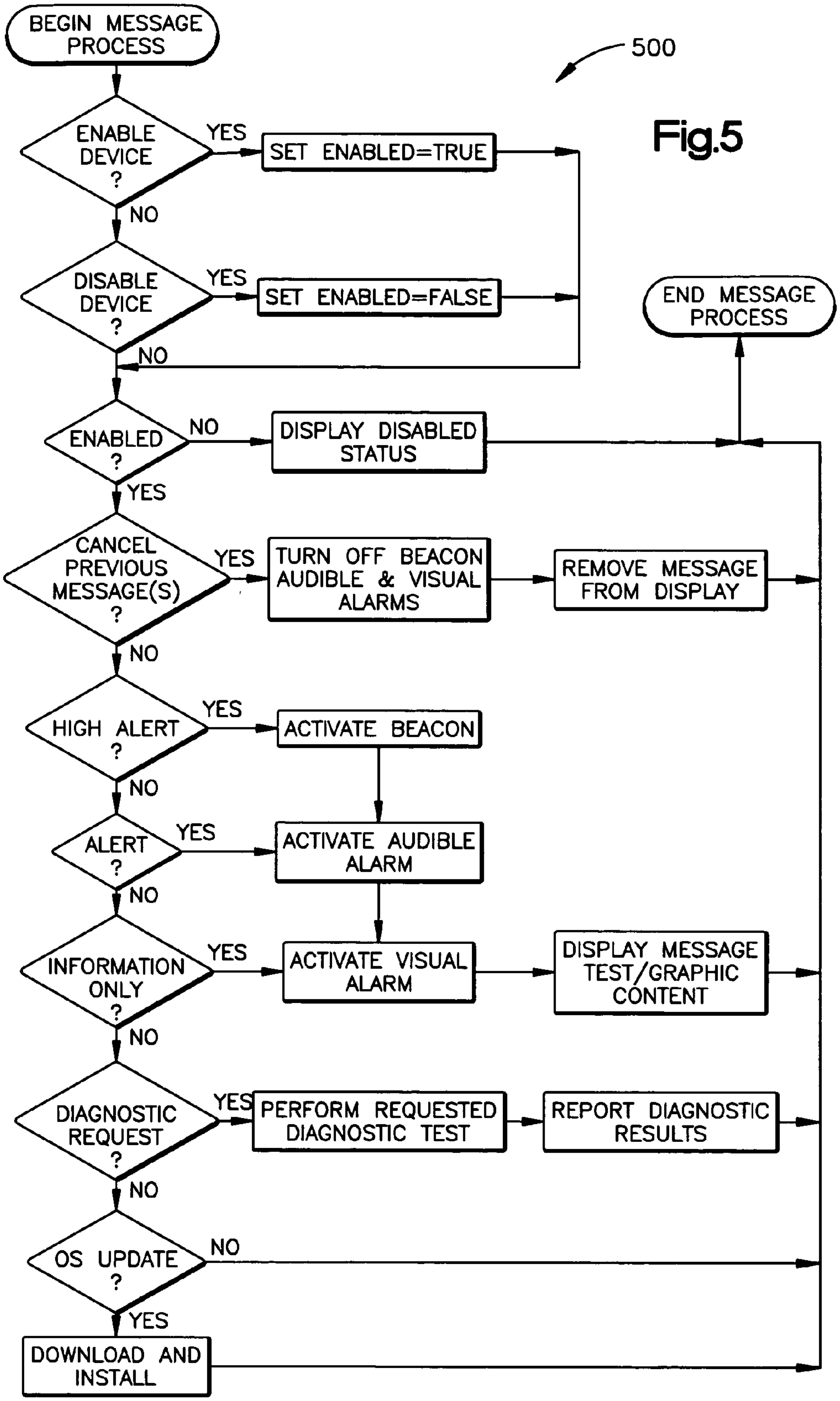
FIG. 5 is a flow diagram of firmware embedded in a microprocessor or microcontroller of the remote station of FIG. 2 for power-up and continuing operation.

FIG. 5 at 500 presents a flow chart of the message processing logic employed by the remote station 150 upon receiving a properly formatted message from the control center 110. The remote unit will analyze the message and take actions as shown in the flow chart based upon the content of the message. The programming logic illustrated in the flow chart 500 is preferably embodied in firmware of the remote station digital integrated circuit 162.

Figure 6:
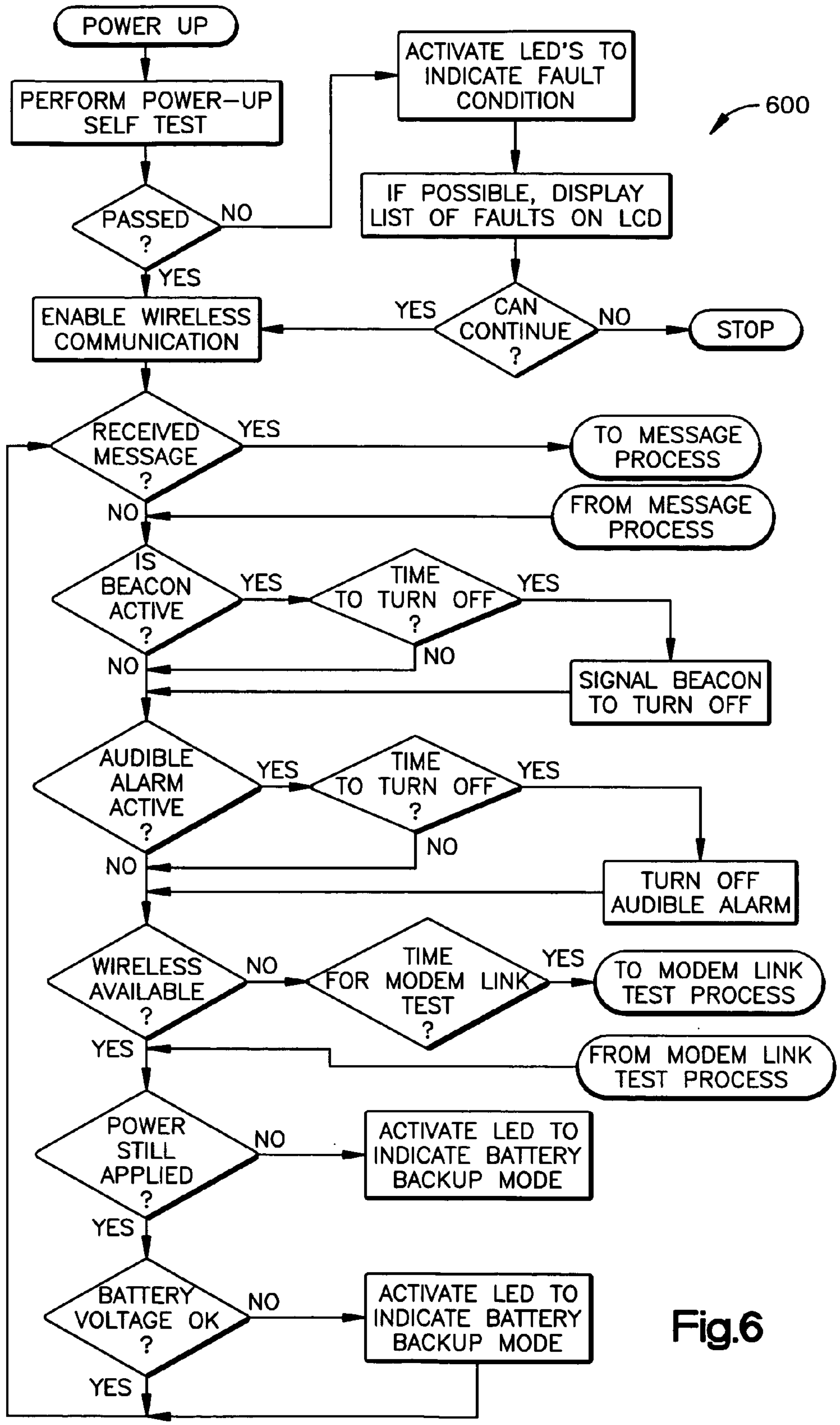
FIG. 6 is a flow diagram of firmware embedded in the microprocessor or microcontroller of the remote station for FIG. 2 for message processing actions.

FIG. 6 at 600 presents a flow chart of the remote station's power-up procedures and its continuous task loop to be performed upon successful completion of the power-up sequence. Again, the programming logic illustrated in the flow chart 600 is preferably embodied in firmware of the remote station digital integrated circuit 162.

Figure 7:
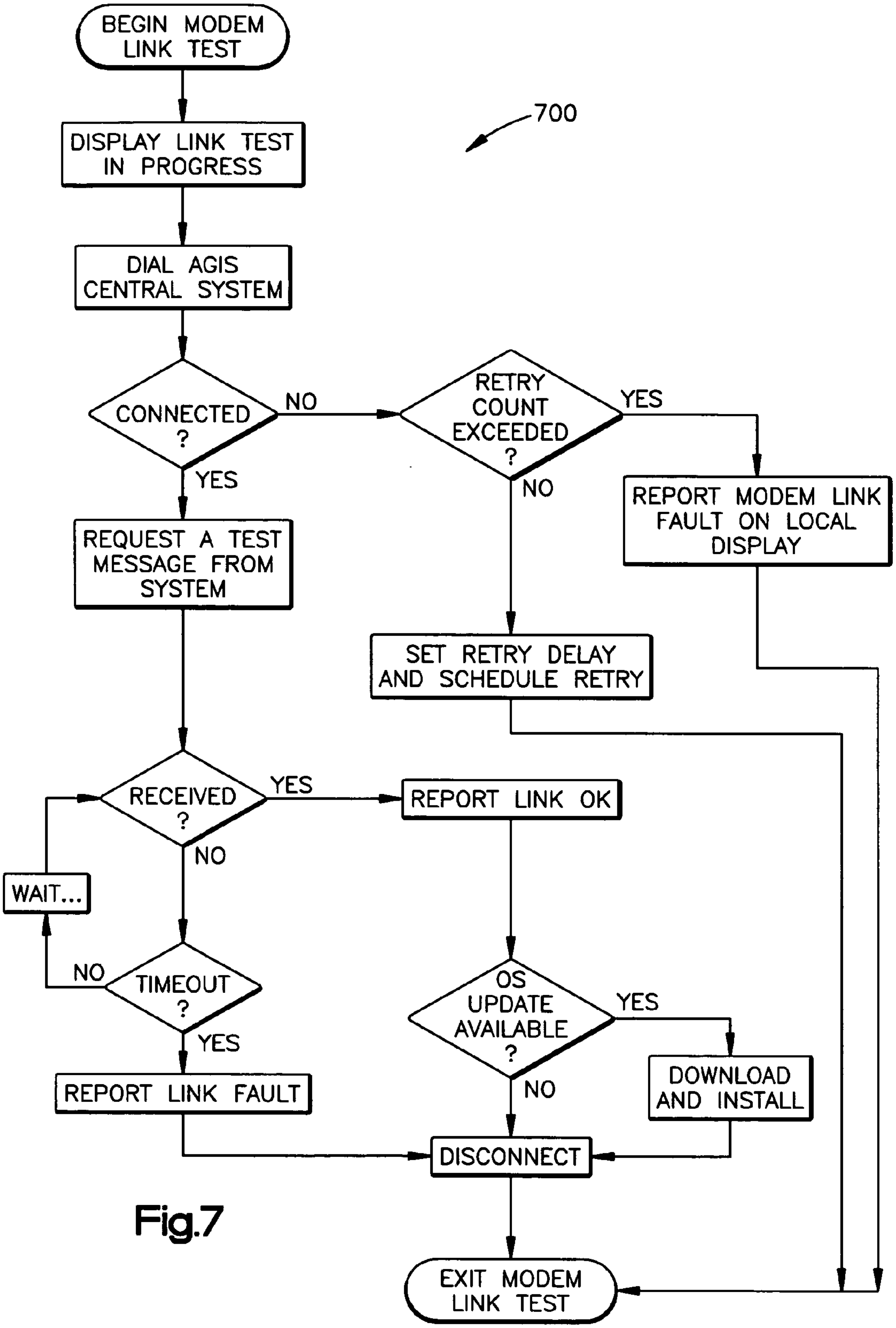
FIG. 7 is a flow diagram of firmware embedded in the microprocessor or microcontroller of the remote station for a functional test of modem communications when the remote station is used solely with a dial-up phone connection.

FIG. 7 at 700 presents a remote station modem link test flow chart showing the steps required to perform a functional test of the modem communications to the control center 110. This form of link test would be used only when dial-up phone connection is the sole communications link to the control center 110. As before, the programming logic illustrated in the flow chart 700 is preferably embodied in firmware of the remote station digital integrated circuit 162.

Beacon 200

Associated with each remote station 150 is at least one visible beacon 200. Under certain conditions, a remote station 150 will send a radio frequency (rf) signal to cause the beacon 200 to activate its illumination source 202. Preferably, a remote station 150 is disposed in a building 250 and the associated beacon 200 is mounted high on or above the building 154 in a location easily seen from the street and easily seen by occupants of the building who may be working or playing outside the building 250.

The function of the beacon 200 is two-fold. In the event a person uses the building phone system to call for emergency services (fire, police, ambulance, community alert), the remote station 150, which is coupled to the building phone system 254, recognizes the emergency services call and sends an rf transmission to the control center 110 to alert the control center of the emergency call. The control center 110 may take a range of actions, depending on the level of service the user has opted for, from simply logging the occurrence of the emergency services call in the control center database system 122, to calling other persons specified by the user to be alerted in the event of a call to emergency services, to dispatching a security patrol to the user's building 250 to aid in dealing with the emergency and/or securing the building in the event the user is transported to a hospital.

At the same time, when the remote station 150 determines a call to emergency services has been made via the building phone system 254, after termination of the emergency call and an additional 60 second delay, the remote station 150 sends an rf signal to the beacon 200 to actuate the beacon light 202 to guide emergency personnel responding to the emergency services call to the location of the building 250. The purpose of the 60 second delay in actuation of the beacon light 202 is to allow the user of the remote station, if desired, to prevent actuation of the beacon light 202 by pressing the "beacon off " user input key **166*j* within 60 seconds after termination of the emergency call. In certain situations, the user (that is, the caller to 911) may not want the beacon light 202 to be activated upon placing a call to 911, the user input key 166*j* provides that option to the user for a 60 second period after ending the call. For example, if the user is calling 911 to report domestic violence taking place at a neighboring residence, the user may not want the violent neighbor to know who called the police for fear of future retaliation. Thus, after termination of the 911 call reporting the domestic violence, the user would press the user input key 166*j* within 60 seconds to prevent the actuation of the beacon light 202. More generally, pressing the beacon off user input key 166*j* causes deactivation of the beacon light 202. That is, if the user input key 166*j* is pressed at any time when the beacon light 202** is actuated, the beacon light will be turned off.

The system 100 also provides for a targeted activation of a beacon 200 associated with a specific remote station 150 directly by the control center 110. A targeted activation of a beacon 200 would occur if emergency personnel were seeking to locate a particular building 250 and no 911 had originated from the building. In such a case, the emergency personnel would contact the control center 110, either directly or via a dispatcher, and request that the building beacon 200 be activated. The control center 110 would transmit an rf signal to actuate the beacon light 202.

The second function of the beacon 200 is to alert the user of a high level alert message 116. In the event of a high level alert message 116, the control center 110 will send an rf signal to the remote station 150 causing the remote station 150 actuate the beacon light 202. Alternately, the control center 110 may transmit an rf signal which is received by the beacon 200 and causes the actuation of the light 202. This provides the user with both an audible alert of the high level alert message 116 via the speaker 172 and a visual alert of the message 116 via the beacon light 202.

The central control 110 determines the relative importance of an alert message 116 and determines whether or not to actuate the beacon light 202. In determining what remote stations 150 should receive an alert message 116 (i.e., what are the set of remote stations 152 which need to be provided information about a particular advisory 116), the control center 110 necessarily makes a determination as to the importance of the advisory 112 and, more specifically, how important the advisory 112 is to each remote station 150 based on the advisory and the information regarding the remote station user stored in the central control database system 122. For example, a user family with no children would have little need to receive an alert message 116 regarding local school closings due to inclement weather but would have a need to be made aware of the closing of a freeway due to an accident if someone in the user family travels the freeway to go to work, school, etc.

If an advisory 116 is of sufficient importance to warrant urgent and immediate action, as in an emergency order to evacuate a neighborhood due to a hazardous chemical spill, the control center 110 will assign a high level of importance to the advisory 116 such that when an alert message 116 is sent to the select group of remote stations 152 or broadcast to all remote stations 150 via an rf signal, the rf signal transmitting the alert message 116 also includes a signal causing the remote stations to activate their respective beacon lights 202. Alternately, the alert message signal transmitted by the control center 110 may directly cause the beacon light 202 to activate. The beacon light 202 will turn off after a predetermined time on or upon the remote station 150 or the control center 110 sending an rf signal canceling actuation of the beacon light 202.

The beacon light 202 preferably is a multi-colored strobe light 202, which includes both visible and infrared light sources. The visible illumination source of the light 202 has sufficient intensity to be easily located from a minimum distance of 100 yards. The beacon 200 is suitable for mounting above the building 250, i.e., on a mast extending upwardly from the roof or chimney for maximum visibility from the street the building is facing. If mounting the beacon 200 above the building roof peak is impractical, alternately, installation on an exterior wall of the building facing the street, as close to a peak of the roof of the building 250 as possible, is preferred. Yet another alternative would be to mount the beacon 200 at the top of a flag pole in front of the building. Yet another alternative would be to use multiple beacons 200. For example, if the building is situated between two streets, either of which may be used by emergency personnel, then installation of two beacons 200 on or above the building 250, one beacon facing each street would be desirable. Other locations for beacons 200 would include being mounted to mailboxes and fences around a perimeter of the building property.

Figure 4:
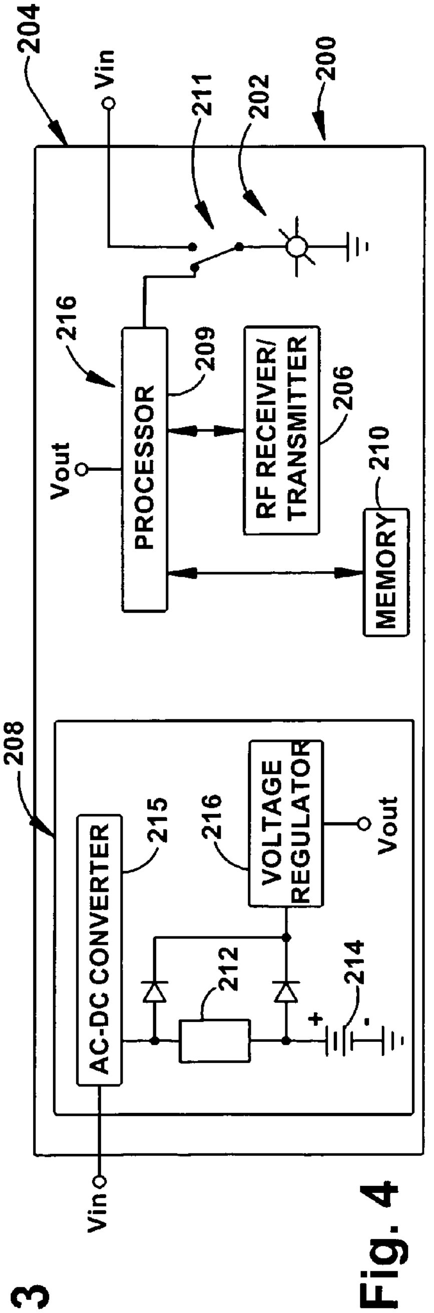
FIG. 4 is a block diagram of a visible beacon or light of the safety/security alert system of FIG. 1.

As can best be seen in schematic block diagram of FIG. 4, in addition to the beacon light 202, the beacon 200 includes electronics 204 such as an rf receiver 206, a power supply 208, a processor 209 and memory 210. The rf receiver 206 receives rf transmissions from the remote station 150 and the central control 110, the processor 209 analyzes the communications and, when appropriate, activates the beacon light 202 via a switch 211. When, the switch 211 is turned on by the processor 209, the light 202 is coupled to the building AC power, $V_{IN}$.

As with the remote station 150, the beacon 200 includes the power supply 208 to operate beacon electronics 204. The power supply 208 is adapted to receive building AC power, $V_{IN}$, and provide a regulated 3–5 V DC output voltage, $V_{OUT}$, to beacon electronics 216 utilizing a AC/DC converter 215 and a voltage regulator 216. The power supply 208 also includes a battery charging circuit 212 and a battery pack 214 for providing power to the beacon electronics 204 in the event of a power outage. Alternately, the power supply 208 could consist solely of a replaceable battery pack. Minimum requirements for the battery pack 212 include operation in standby mode for a minimum of one year and up to 8 hours of activated or lighted time.

Like each remote station 150, each beacon 200 shall have a unique identifier programmed at the time of manufacture. This beacon identifier will be configured into the remote station 150 that will be used to operate the beacon 200 such that when the remote station 150 transmits an rf signal to activate the beacon light, the rf signal does not turn on the beacons of other users within the range of the rf signal.

Manual test of the beacon 200 can be activated from the remote station 150. In manual test mode the light 202 will be activated for a maximum of 5 minutes. Verification of proper operation will require visually determining if the light 202 is activated.

Control Center Commands

System commands are electronic messages that are communicated between the control center 110 and the individual remote stations 150. These messages can be sent to each remote station individually or to multiple stations via the broadcast identifier.

Enable/Disable Device

This system command to the remote station 150 will control the station's operational state. A disable message will cause the remote station 150 to stop performing its function. After receiving the disable message, the station 150 will only respond to a subsequent enable message. The enable message causes the remote station 150 to begin to respond to all system commands and perform normally.

Configure Remote Station

A configuration command is sent from the control center 110 to a remote station 150. This command will send to the remote station 150 all information necessary for that station to perform within the system 100. The information included in this command would include:

Phone number to call to initiate an emergency.

Beacon identification number (identifier) for the beacon 200 or beacons associated with the remote station 150.

Link test time and period (link test to be described below).

Link test phone number to use.

Personal remote identifier for the personal remote 220 or remotes (if any) associated with the remote station.

Time of Day Set

This message from the control center 110 will be sent periodically to keep the remote station time synchronized to the system time. This will generally occur during the period link test.

Activate/Deactivate Beacon Light 202

In addition to the remote station 150 activating the light 202 of its associated beacon 200, under certain conditions it may be desirable for the control center 110 to activate the beacon light 202. Accordingly, a control center command to activate the beacon light 202 is provided. The control center 110 will send this command to the remote station 150 when it is necessary to activate the beacon light 202. Upon receipt of this command, the remote station 150 will initiate wireless communication with the beacon electronics and activate the light 202. If the control center 110 has a need to deactivate the light 202, prior to a timed automatic turn off of the light 202, a command can be sent by the control center 110 to the remote station 150 or directly to the beacon 200 to turn off the light 202.

Emergency Service Request

The user of the remote station 150 will typically use the building telephone system to request emergency services. However, the remote station 150 or the personal remote 220 may also be used to request emergency services in the event that the building telephone system is not functioning.

An emergency service request command is provided for such a situation. This command is initiated by the unit at the request of the user by utilizing the input key 166*c* (FIG. 2) on the remote station front housing piece 154*a*. The command may also be initiated via a user input key on the personal remote 220. Upon receiving the request, the remote unit 150 sends this command to the control center 110 and/or to the 911 dispatcher. The command includes the device unique identifier to allow the control center 110 to look up the location of the remote station 150 in its database 122. A emergency service request directed to the 911 dispatcher would include information regarding the remote station indentifier or unit number, user name, address and phone number. Additionally, other relevant information regarding the user, such as medical information, may also be given.

Remote Station Operating System Update

This command from the control center 110 will cause the remote station 150 to enter into a program download mode. The station 150 will acknowledge entering this mode to the control center 110, at which point the program (operating system) download will begin.

The remote station 150 device will download the update to its work memory and verify that a complete and error free download was received. If a valid download was received, the remote station 150 will commit the update to its permanent memory and indicate back to the control center 110 that the download was successfully completed. If the download was not valid, then the remote station 150 will indicate an update failure back to the control center 110. The control center 110 will then retry the download either immediately or at a later time.

Diagnostics

The system 100 facilitates the performance of a number of diagnostic tests to insure the remote stations 150 are functioning properly. The diagnostic tests include the following:

Periodic Modem Link Test

Each remote station 150 will be programmed to periodically connect via the telephone modem connection 184 to the control center 110. If a remote station 150 does not connect as expected, it will be recorded as failed by the control center 110. The control center 110 will reset the remote station 150 back to functional upon successful completion of the link test.

Successful completion of the link test will also include a test alert message sent by the control center 110 via the wireless link to the remote station 150. The remote station 150 will signal successful receipt of the test message by sending an acknowledgement via the established modem link.

If the remote station 150 does not successfully complete the test, an indication of failure is provided on the station.

Control Center Initiated Test Mode

The control center 110 can also request a remote station 150 to enter a diagnostic mode using the diagnostic command. This request is made via the wireless communication link 176. Diagnostic test results can be monitored by the control center 110 over the wireless connection 176.

A "run diagnostic" command can be sent from the control center 110 to force the remote station 150 to perform some or all of its diagnostics tests. The command will indicate which test is to be performed. The same diagnostic tests can be performed using the interface keys 166 of the remote station front housing 152*a*. The diagnostic tests performed include:

ROM test—verifies that the remote station program memory is error free

RAM test—verifies that the remote station work memory is error free

Display test—displays several test patterns on the display 164 that can be visually validated Light test—has the remote station 150 activate the beacon light 202 of its associated beacon or beacons 200 for visual validation Alert message test—tests the ability of the remote station 150 to receive an alert message 116

Communications test—verifies that data communications between control center 110 and remote station 150 can be performed Audible indicator test of remote station speaker 172

Visual indicator test of indicator lights 168, 170

Battery test of battery pack 192

Manual Test Mode

A manual test mode is provided by the remote station 150. Upon entering manual test mode using a test user interface key 166*d*, the station 150, using the display 164 will provide a list or menu of tests that can be performed. Using input keys 166*e–i*, the user can then select a test to be performed and view the success or failure of the test via the display 164.

Personal Remote

As an optional feature, the system 100 may include a personal remote 220 associated with a remote station 150. The personal remote 220 is for the purpose of requesting emergency service when the user is physically out of reach of the remote station 150 or a telephone. The personal remote 200 is extremely compact and may be worn on a wrist band, a key chain, or around a user's neck. Pushing an activation button on the personal remote 220 will initiate an emergency call either to the control center 110 via its associated remote station 150 and/or directly to a 911 dispatcher. A personal remote 220 configured to direct dial a 911 dispatcher will contain a prerecorded message which will be played back during a call to 911. The message will contain information, such as the user's name, address and telephone number, the remote station identifier, and the personal remote identifier, and will inform the dispatcher that the call was placed through the system 100. The central control 110 or the remote station 150 will also activate the beacon light 202 to assist emergency personnel in locating user.

The personal remote 220 is battery operated (preferably a small coin type battery) and transmits a radio signal of sufficient power to have a range of 300 feet from the remote station 150. Like the remote station 150, the personal remote 220 is programmed with a unique identifier so that the personal remote 220 only communicates with its associated remote station 150. More than one personal remote 220 may be associated with a given remote station 150.

While the present invention has been described with a degree of particularity, it is the intent that the invention includes all modifications and alterations from the disclosed design falling within the spirit or scope of the appended claims.

We claim:

1. A safety/security system comprising:

a) a control center for receiving an advisory from a source and transmitting an alert message regarding the advisory to a remote station, the alert message including an identifier to identify a remote station from a set of remote stations that is an intended recipient of the alert message and for receiving a transmission from the remote station; and b) the remote station including a receiver, a transmitter, a visual display, and a user interface, the remote station utilizing the receiver to receive the alert message from the control center, processing the alert message to determine if the remote station is an intended recipient of the alert message and, if the remote station is an intended recipient of the alert message, utilizing the display to display information related to the alert message, the remote station further utilizing the transmitter to send an acknowledgement to the control center when a user of the remote station actuates the user interface to verify receipt of the information displayed on the display related to the alert message.

2. The safety/security system of claim 1 further including a visible beacon coupled to the remote station, the visible beacon mounted to or near a building where the remote station is disposed and including a source of visible illumination actuatable by the remote station, the beacon being actuated by the remote station upon determining that the remote station is an intended recipient of the alert message and the alert message has been assigned a predetermined level of importance by the control center.

3. The safety/security system of claim 2 wherein the visible beacon includes an assigned identifier and upon the remote station transmitter transmitting a radio frequency signal to actuate the visible beacon, electronics of the visible beacon verifies the signal includes the visible beacon identifier prior to actuation of the beacon.

4. The safety/security system of claim 2 wherein remote station is coupled to a building communication system and the beacon is actuated by the remote station when a call is made to emergency services via the building communication system.

5. The safety/security system of claim 4 wherein the building communication system includes a telephone line and the remote station is electrically connected to the telephone line.

6. The safety/security system of claim 1 wherein the remote station identifier is a unique identifier associated with the remote station.

7. The safety/security system of claim 1 wherein the remote station receiver includes a wireless radio frequency receiver for receiving wireless transmissions from the control center.

8. The safety security system of claim 1 wherein the remote station receiver includes a modem for receiving transmissions from the control center via telephone communication lines.

9. The safety security system of claim 1 wherein the display includes both text and graphic messaging.

10. The safety security system of claim 1 wherein the remote station is assigned an identifier and processing the alert message to determine if the remote station is an intended recipient of the alert message includes ascertaining if the alert message includes the remote station identifier.

11. A safety/security system comprising:

a) a control center for receiving an emergency, health or safety advisory and transmitting an alert message regarding the advisory to a remote station, the alert message including an identifier to identify the remote station that is an intended recipient of the alert message and for receiving transmissions from the remote station indicating that the alert message has been acknowledged by a user of the remote station; and b) the remote station including:

i) an identifier;

ii) a visual display;

iii) a user interface iv) electronics for receiving the alert message from the central control center, processing the alert message to determine if the remote station is an intended recipient of the message and, if the remote station is an intended recipient of the alert message, utilizing the display to display information related to the alert message, the electronics further sending an acknowledgement message to the control center when a user of the remote station actuates the user interface to verify receipt of the information displayed on the display related to the alert message.

12. The safety/security system of claim 11 further including a visible beacon coupled to the remote station, the visible beacon mounted to or near a building where the remote station is disposed and including a source of visible illumination actuatable by the remote station, the beacon being actuated by the remote station upon receiving and processing an alert message if the remote station is an intended recipient of the alert message and the alert message has a predetermined level of importance assigned to it by the control center.

13. The safety/security system of claim 12 wherein the remote station transmits a radio frequency signal to actuate the visible beacon, the radio frequency signal including an identifier associated with the visible beacon, the beacon identifier being verified by the beacon prior to actuation of the beacon.

14. The safety/security system of claim 12 wherein remote station is coupled to a building communication system and the beacon is actuated by the remote station when a call is made to emergency services via the building communication system.

15. The safety/security system of claim 11 wherein processing the alert message to determine if the remote station is an intended recipient of the message includes ascertaining if the alert message includes the remote station identifier.

16. The safety/security system of claim 11 wherein the user interface is an input key disposed on a housing of the remote station.

17. The safety/security system of claim 11 wherein the remote station includes a receiver adapted to receive wireless transmissions from the control center.

18. The safety/security system of claim 11 wherein the remote station includes a modem for receiving transmissions from the control center via telephone transmission lines.

19. The safety/security system of claim 11 wherein the display includes both text and graphic messaging.

20. The safety/security system of claim 11 wherein the system further includes a personal remote unit coupled to the remote unit via a radio frequency signal, the personal remote unit includes an identifier to uniquely associate the personal remote unit to the remote unit, the user interface actuatable for initiating an emergency service request.

21. A safety/security system comprising:

a) a central control station for receiving an advisory from a source and transmitting an alert message regarding the advisory to a select group of one or more remote stations, the alert message including an identifier to identify remote stations in the select group of one or more remote stations that are intended recipients of the alert message and for receiving transmissions from the remote stations; and b) a plurality of remote stations including the select group of one or more remote stations, each of the plurality of remote stations including a receiver, a transmitter, a visual display, and a user interface, the remote station utilizing the receiver to receive the alert message from the central control station, processing the alert message to determine if the remote station is an intended recipient of the alert message and, if the remote station is an intended recipient of the alert message, utilizing the display to display information related to the alert message, the remote station further utilizing the transmitter to send an acknowledgement message to the central control station when a user of the remote station actuates the user interface to verify receipt of the information displayed on the display relating to the alert message.

22. The safety/security system of claim 21 wherein the processing of the alert message by a remote station to determine if the remote station is an intended recipient of the alert message includes ascertaining if the alert message includes an identifier associated with the remote station.

23. The safety/security system of claim 21 further including, for each of the plurality of remote stations, a visible beacon coupled to the remote station, the visible beacon mounted to or near a building where the remote station is disposed and including a source of visible illumination acuatable by the remote station and positioned so as to be visible to emergency personnel en route to the building and to occupants of the building who are outside in the vicinity of the building, the beacon being actuated by the remote station upon ascertaining that the remote station is an intended recipient of the alert message and the alert message has been assigned a predetermined level of importance by the central control station.

24. The safety/security system of claim 23 wherein for each of the plurality of remote stations, the remote station transmitter transmits a radio frequency signal to actuate the visible beacon.

25. The safety/security system of claim 24 wherein the visible beacon is assigned a beacon identifier and the beacon is not actuated until beacon electronics verify that the radio frequency signal transmitted by the remote station includes the beacon identifier.

26. The safety/security system of claim 23 wherein, for each of the plurality of remote stations, the remote station is coupled to a building communication system and the beacon is actuated by the remote station when a call is made to emergency services via the building communication system.

27. The safety/security system of claim 26 wherein the building communication system includes a telephone transmission line and the remote station is electrically connected to the telephone transmission line.

28. The safety/security system of claim 21 wherein, for each of the plurality of remote stations, the remote station identifier is a unique identifier associated with the remote station.

29. The safety/security system of claim 21 wherein, for each of the plurality of remote stations, the remote station receiver includes a radio frequency receiver for receiving wireless transmissions from the central control station.

30. The safety/security system of claim 21 wherein, for each of the plurality of remote stations, the remote station receiver includes a modem for receiving transmissions from the central control station via telephone transmission lines.

31. The safety/security system of claim 21 wherein the select group of one or more remote stations includes a plurality of remote stations and the alert message identifier transmitted by the central control station comprises a broadcast identifier to identify the plurality of remote stations comprising the select group of one or more remote stations.

32. A method for notifying a user of a safety/security system of a safety or emergency advisory and verifying that the user has received information regarding the advisory, the steps of the method comprising:

a) providing a central control station for receiving the safety or emergency advisory and transmitting an alert message regarding the advisory to a remote station, the alert message including an identifier to identify the remote station that is an intended recipient of the alert message and for receiving transmissions from the remote station; and b) installing a remote station at or near a building of the user, the remote station including:

i) an identifier;

ii) a visual display;

iii) a user interface iv) electronics for receiving the alert message from the central control center, processing the alert message to determine if the remote station is an intended recipient of the message by ascertaining if the alert message includes the remote station identifier and, if the remote station is an intended recipient of the alert message, utilizing the display to display information related to the alert message, the electronics further sending an acknowledgement to the control center when a user of the remote station actuates the user interface to verify receipt of the information displayed on the display related to the alert message;

c) receiving the alert message from the central control center;

d) processing the alert message to determine if the remote station is an intended recipient of the message by ascertaining if the alert message includes the remote station identifier;

e) if the remote station is an intended recipient of the alert message, utilizing the display to display information related to the alert message, and f) sending an acknowledgement to the central control station when the user actuates the user interface to verify receipt of the information displayed on the display related to the alert message.

33. The method set forth in claim 32 wherein the step of processing the alert message to determine if the remote station is an intended recipient of the message includes ascertaining if the alert message includes the remote station identifier.

34. The method set forth in claim 32 further including the step of providing a visible beacon coupled to the remote station, the visible beacon mounted to or near the building where the remote station is disposed and including a source of visible illumination acuatable by the remote station, the beacon being actuated by the remote station upon ascertaining that the remote station is an intended recipient of the alert message and the alert message has been assigned a predetermined level of importance by the central control station.

* * * * *